United States Patent
Zheng et al.

(10) Patent No.: US 11,025,858 B2
(45) Date of Patent: Jun. 1, 2021

(54) FRAME RATE CONVERSION

(71) Applicant: Netflix, Inc., Los Gatos, CA (US)

(72) Inventors: Weiguo Zheng, San Jose, CA (US); Rex Yik Chun Ching, San Ramon, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 16/536,302

(22) Filed: Aug. 8, 2019

(65) Prior Publication Data

US 2021/0044777 A1 Feb. 11, 2021

(51) Int. Cl.
*H04N 7/01* (2006.01)
*H04N 9/475* (2006.01)
*G09G 5/00* (2006.01)
*G09G 5/18* (2006.01)

(52) U.S. Cl.
CPC ........... *H04N 7/0127* (2013.01); *G09G 5/005* (2013.01); *G09G 5/18* (2013.01); *G09G 2340/0435* (2013.01)

(58) Field of Classification Search
CPC ......... H04N 7/0127; G09G 5/005; G09G 5/18
USPC ...................... 348/441, 443, 500, 513, 425.4
See application file for complete search history.

(56) References Cited

U.S. PATENT DOCUMENTS

| 8,279,344 B2* | 10/2012 | Boak .................. H04N 5/04 348/513 |
| 2009/0185795 A1 | 7/2009 | Itani et al. |
| 2014/0002739 A1 | 1/2014 | Kwa et al. |

FOREIGN PATENT DOCUMENTS

WO 2021/026396 A1 2/2021

OTHER PUBLICATIONS

International Search Report & Written Opinion received for PCT Application Serial No. PCT/US2020/045290 dated Dec. 10, 2020, 13 pages.

* cited by examiner

*Primary Examiner* — Jefferey F Harold
*Assistant Examiner* — Jean W Desir
(74) *Attorney, Agent, or Firm* — FisherBroyles, LLP

(57) ABSTRACT

The disclosed method includes accessing video content encoded at a specified frame rate, and determining a refresh rate for an electronic display on which the video content is to be presented. The method next includes specifying a time interval for the video content over which frame rate conversion is to be applied to synchronize the video content frame rate with the electronic display refresh rate. The method also includes presenting the video content on the electronic display where the playback speed is adjusted for a first part of the interval. At this adjusted speed, the interval is played back using original video frames and multiple frame duplications. The presenting also adjusts playback speed of a second part of the interval. At the adjusted speed, the interval is played back using the original frames and a different number of frame duplications. Various other methods, systems, and computer-readable media are also disclosed.

20 Claims, 12 Drawing Sheets

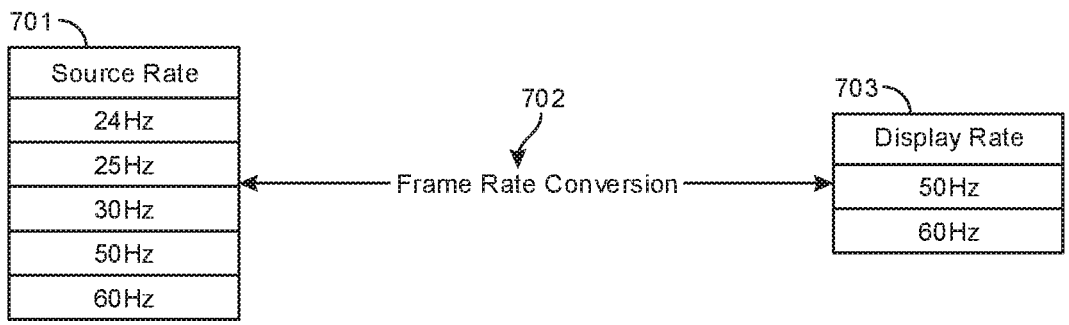
FIG. 7
| Case# | FRC ratio | Ratio | 1st Order (X2) | 2nd Order (X3) | 3rd Order (X4) |
|---|---|---|---|---|---|
| 1 | 50Hz->60Hz | 1.2 | 10 | 0 | 0 |
| 2 | 30Hz->50Hz | 1.67 | 20 | 0 | 0 |
| 3 | 25Hz->50Hz | 2.0 | 25 | 0 | 0 |
| 4 | 30Hz->60Hz | 2.0 | 30 | 0 | 0 |
| 5 | 24Hz->60Hz | 2.5 | 24 | 12 | 0 |
| 6 | 25Hz->60Hz | 2.4 | 25 | 10 | 0 |
| 7 | 24Hz->25Hz | 1.042 | 1 | 0 | 0 |
| 8 | 24Hz->50Hz | 2.083 | 24 | 2 | 0 |
| 9 | 24Hz->50Hz* | 2.083 | 24 | 1 | 1 |
FIG. 8
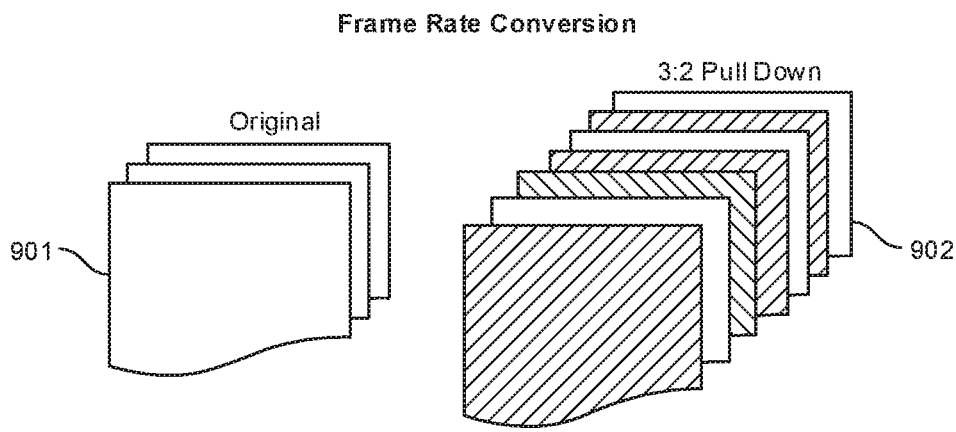
FIG. 9

FRAME RATE CONVERSION

BACKGROUND

Digital video content including movies, television, online streaming videos, and other content is typically encoded using one of a variety of different encoding formats. Most commonly, video content is encoded using one of the motion picture experts group (MPEG) standards such as MPEG-4. This encoding specifies the frame rate at which the video is presented. For example, films are typically encoded at 24 frames per second. This video content is then sent to an electronic display for presentation to a user or group of users. The electronic display (e.g., a liquid crystal display (LCD), organic light-emitting diode (OLED) display, or some other type of display) typically presents the content at a specified refresh rate.

For example, many displays present content at 50 Hz, 60 Hz, 120 Hz or even 240 Hz. As such, the electronic display is generating a new image on the display 50, 60, 120, or 240 times each second. Because the video content sent to the display is encoded at a much lower frame rate (e.g., 24 frames per second), the display may be redrawing the same frame multiple times per second. When redrawing these frames multiple times each second, the number of frames each second (e.g., 24) often does not cleanly divide into the display's refresh rate of 50 Hz, 60 Hz, etc. As such, additional video frames or parts of frames are duplicated during playback to align the frame rate of the video content with the refresh rate of the electronic display. Current duplication and synchronization methods, however, are often jittery and may result in noticeable artifacts that degrade the viewing experience of the user.

SUMMARY

As will be described in greater detail below, the present disclosure describes systems and methods for aligning the frame rate of a video with the refresh rate of an electronic display. The method includes accessing video content that is encoded at a specified frame rate. The method also includes determining a refresh rate for an electronic display on which the video content is to be presented. The method further includes specifying a time interval for the video content over which frame rate conversion is to be applied to synchronize the frame rate of the video content with the refresh rate of the electronic display. The method also includes presenting the specified time interval of video content on the electronic display. The presenting includes adjusting playback speed for a first portion of the specified interval of video content, so that the first portion of the specified interval is played back using original video frames and a first sequence of frame duplications, and adjusting playback speed of a second, subsequent portion of the specified interval of video content, so that the second portion of the specified interval is played back using the original video frames and second, different sequence of frame duplications.

In some examples, the second, different sequence of frame duplications includes at least a minimum threshold number of duplicate frames. In some examples, adjusting the playback speed for the first portion of the specified interval of video content includes increasing the playback speed for the first portion of the specified interval of video content. In some examples, adjusting the playback speed for the second portion of the specified interval of video content includes decreasing the playback speed for the second portion of the specified interval of video content.

In some examples, the playback speed is adjusted within a specified maximum amount of speeding or slowing the playback speed. In some examples, adjusting playback speed includes altering a presentation time stamp associated with the video content. In some examples, the specified time interval is longer than one second. In some examples, the specified time interval is at least three seconds.

In some examples, the playback speed is adjusted based on the type of video frames being presented. In some examples, intervals of video content that include first order frame duplications are automatically played back at a specified playback speed. In some examples, intervals of video content that include second order frame duplications are automatically played back at a specified playback speed. In some examples, the number of duplicated frames is repeated at a specified interval.

A corresponding system includes at least one physical processor and physical memory comprising computer-executable instructions that, when executed by the physical processor, cause the physical processor to access a portion of video content, where the video content is encoded at a specified frame rate. The physical processor then determines a refresh rate for an electronic display on which the video content is to be presented. The physical processor further specify a time interval for the video content over which frame rate conversion is to be applied to synchronize the frame rate of the video content with the refresh rate of the electronic display. The physical processor also presents the specified time interval of video content on the electronic display. The presenting includes: adjusting playback speed for a first portion of the specified interval of video content, such that the first portion of the specified interval is played back using original video frames and a first sequence of frame duplications, and adjusting playback speed of a second, subsequent portion of the specified interval of video content, such that the second portion of the specified interval is played back using the original video frames and second, different sequence of frame duplications.

In some examples, the playback speed for each portion of the specified interval of video content is stored in a lookup table. In some examples, the specified interval of video content is played back on the electronic display according to the playback information indicated in the lookup table. In some examples, the lookup table includes delta values that are applied during presentation of the specified time interval of video content on the electronic display to adjust a presentation time stamp for each frame within the specified time interval of video content.

In some examples, the system further tests the presentation of the specified time interval of video content on the electronic display to verify specific quality metrics regarding playback of the video content. In some examples, the frame rate of the video content is 24 frames per second and the refresh rate for the electronic display is 50 Hz. In some examples, the frame rate of the video content is 24 frames per second and the refresh rate for the electronic display is 60 Hz.

In some examples, the above-described method is encoded as computer-readable instructions on a computer-readable medium. For example, a computer-readable medium may include one or more computer-executable instructions that, when executed by at least one processor of a computing device, cause the computing device to access a portion of video content, the video content being encoded at a specified frame rate, determine a refresh rate for an electronic display on which the video content is to be presented, specify a time interval for the video content over which frame rate conversion is to be applied to synchronize the frame rate of the video content with the refresh rate of the electronic display, and present the specified time interval of video content on the electronic display, wherein the presenting includes: adjusting playback speed for a first portion of the specified interval of video content, such that the first portion of the specified interval is played back using original video frames and a first sequence of frame duplications, and adjusting playback speed of a second, subsequent portion of the specified interval of video content, such that the second portion of the specified interval is played back using the original video frames and second, different sequence of frame duplications.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 7 illustrates an embodiment in which video frames at different frame rates are converted for different display rates.

FIG. 8 illustrates a chart with different frame rate conversions and different types of duplicate frames, along with frame rate conversion quality metrics.

FIG. 9 illustrates an embodiment with original video frames and duplicated video frames.

Figure 1:
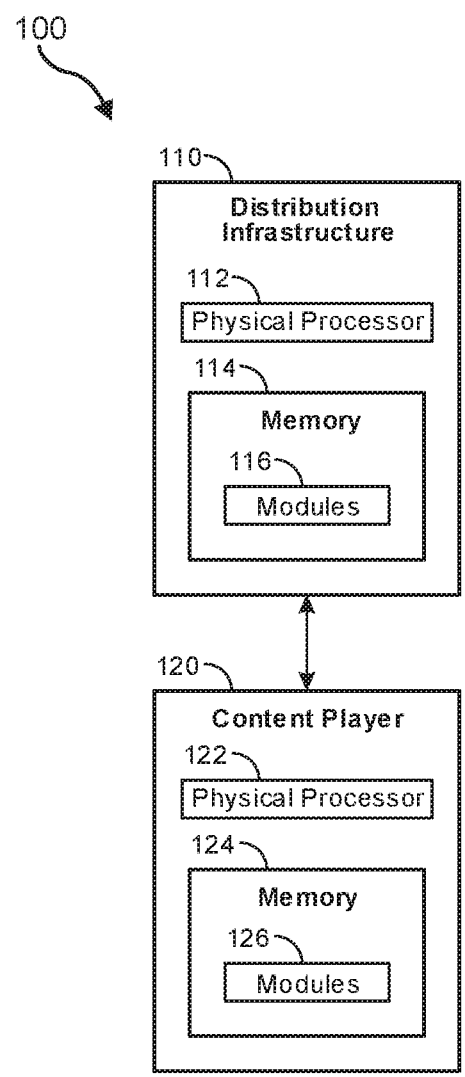
FIG. 1 is a block diagram of an exemplary content distribution ecosystem.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to aligning the frame rate of a video with the refresh rate of an electronic display. As noted above, traditional systems attempt to align the frame rate of the video with the refresh rate of a display by simply adding a duplicate frame or part of a duplicate frame. For example, when converting from 24 frames per second (fps) to 60 Hz (which is often used by displays in the United States and Japan), traditional systems will duplicate all 24 frames once for a total of 48 frames. These traditional systems will then create an additional 12 frames that are duplicated twice for a total of 60 frames. These 60 frames are then presented on the electronic display for $\frac{1}{60}$th of a second each. Subsequent frames are also duplicated and displayed in this manner for the length of the film.

In the case of a film shot at 24 fps that is converted to 50 Hz (as is common in displays in Europe and South America), the 24 original frames are duplicated to create 48 frames, and two of the frames are duplicated a second time for a total of 50 frames. These 50 frames are shown on the display for $\frac{1}{50}^{th}$ of a second each. In other implementations, the original 24 frames are duplicated once, while one frame is duplicated another time and another frame is also duplicated a second time. This typically leads to noticeable jitter and other display artifacts that are visible to the user. It should also be noted that, in these traditional systems, each of the frames is played back at the same rate. Regardless of how the frame duplications occur, the video content is played back at a steady, unchanging rate throughout the movie or tv show.

Other traditional implementations attempt to generate frames that are not straight duplicates. For example, motion interpolation systems look at a selected frame and a subsequent frame and analyze the differences in each of these frames using motion estimation/compensation (MEMC) algorithm. Such systems then compute an intermediary frame that takes the initial position of the pixels in the first frame and transitions the pixels to the final position in the subsequent frame. This intermediary frame thus represents the "average" pixel value of the selected frame and the subsequent frame. These calculations, however, take a relatively large amount of computing power and tend to leave noticeable traces in the picture that are noticeable to users. As such, users often turn such motion estimation systems off on their televisions or monitors.

Still other providers of video content opt to simply reencode their entire library for different markets. For example, videos A, B, and C provided for consumption (e.g., on a streaming platform) may be encoded at 24 fps for easy conversion to 60 Hz displays. Because 24 fps does not convert cleanly to 50 Hz, however, these same videos A, B, and C provided for consumption in Europe are reencoded at 25 fps for easy conversion to 50 Hz. In such cases, frame conversion can simply duplicate each original frame once for a total of 50 fps which displays on a 50 Hz display at a 1:1 ratio. However, for video content providers that have very large libraries, reencoding their entire library for different regions with different display refresh rates is unfeasible.

Accordingly, the embodiments described herein may provide video content to an electronic display at a rate that provides a smooth and clear picture to the user without the video streaming provider having to reencode their library and without introducing motion estimations. In the embodiments described herein, playback speed of certain frames or groups of frames is sped up or slowed down by fractions of a second to accommodate more or fewer frames over a variable display interval. These differences in playback speed are imperceptible to a user and allow video content to be played back smoothly, regardless of its native frame rate and regardless of the refresh rate of the display on which the content is presented.

In some cases, systems that align the frame rate of a video with the refresh rate of an electronic display access video content encoded at a specified frame rate. The systems also determine a refresh rate for an electronic display on which the video content is to be presented. The systems then specify a time interval for the video content over which frame rate conversion is to be applied to synchronize the frame rate of the video content with the refresh rate of the electronic display. The systems further present the time interval of video content on the electronic display. The presenting involves adjusting playback speed for some of the specified interval of video content, so that part of the interval is played back using original video frames and a sequence of frame duplications. The presenting also involves adjusting playback speed of a different part of the interval of video content, so that this part of the interval is played back using the original video frames and different sequence of frame duplications.

The other sequence of frame duplications includes a minimum number of duplicate frames. In some cases, adjusting the playback speed for the interval of video content includes increasing the playback speed for the first part of the interval of video content. Adjusting the playback speed for the other part of the interval of video content includes decreasing the playback speed for that part of the interval of video content. The playback speed is adjusted within a maximum amount of speeding or slowing the playback speed. In some cases, adjusting playback speed includes altering a presentation time stamp associated with the video content. The specified time interval is longer than one second and, in some cases, is at least three seconds.

In some cases, the playback speed is adjusted based on the type of video frames being presented. Intervals of video content that include first order frame duplications are automatically played back at a specified playback speed. Intervals of video content that include second order frame duplications are automatically played back at a specified playback speed. The number of duplicated frames is repeated at a specified interval. In some cases, the playback speed for each part of the interval of video content is stored in a lookup table. The interval of video content is played back on the electronic display according to the playback information indicated in the lookup table. The lookup table includes delta values that are applied during presentation of the time interval of video content on the electronic display to adjust a presentation time stamp for each frame within the time interval of video content.

In some cases, the presentation of the time interval of video content is tested on the electronic display to verify quality metrics regarding playback of the video content. The frame rate of the video content varies based on implementation. In some cases, the frame rate of the video content is 24 frames per second and the refresh rate for the electronic display is 50 Hz. In other cases, the frame rate of the video content is 24 frames per second and the refresh rate for the electronic display is 60 Hz. These embodiments will be explained in greater detail below with regard to FIGS. 1-3 that introduce streaming media players and streaming media environments, FIGS. 4 and 5 which describe a computing architecture and method for computing frame conversions, and FIGS. 6-12 which describe different implementations and alternative embodiments for performing frame conversion.

Figure 2:
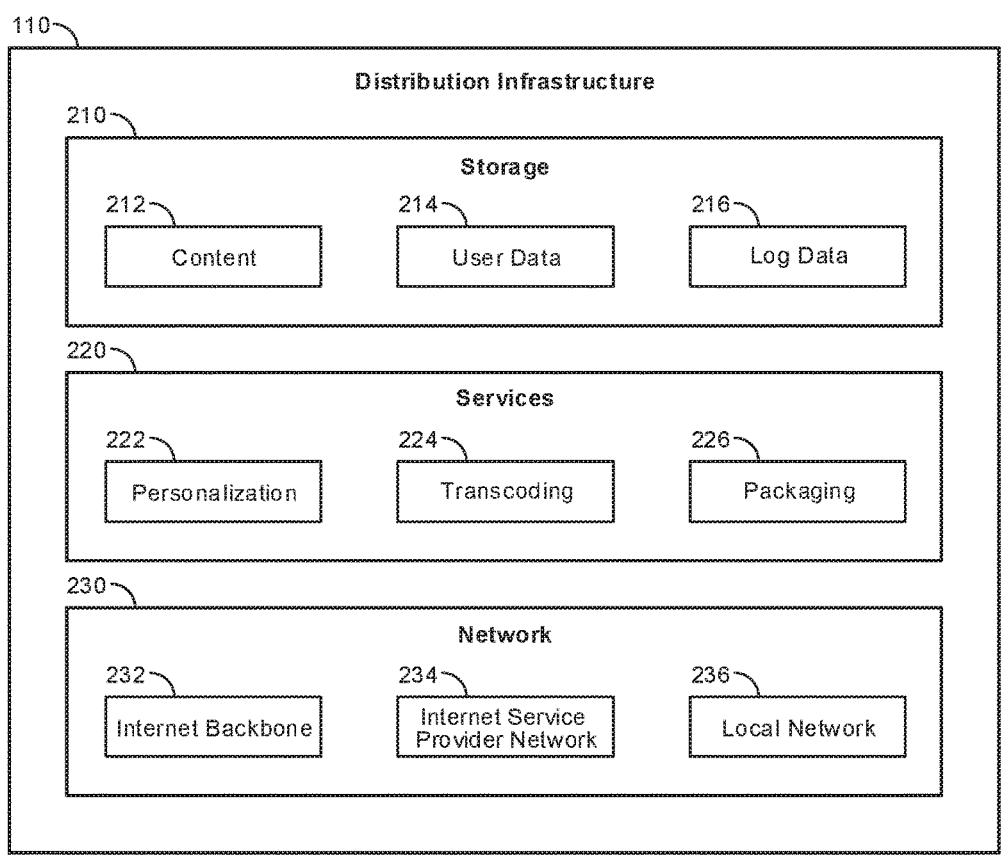
FIG. 2 is a block diagram of an exemplary distribution infrastructure within the content distribution ecosystem shown in FIG. 1.
Figure 3:
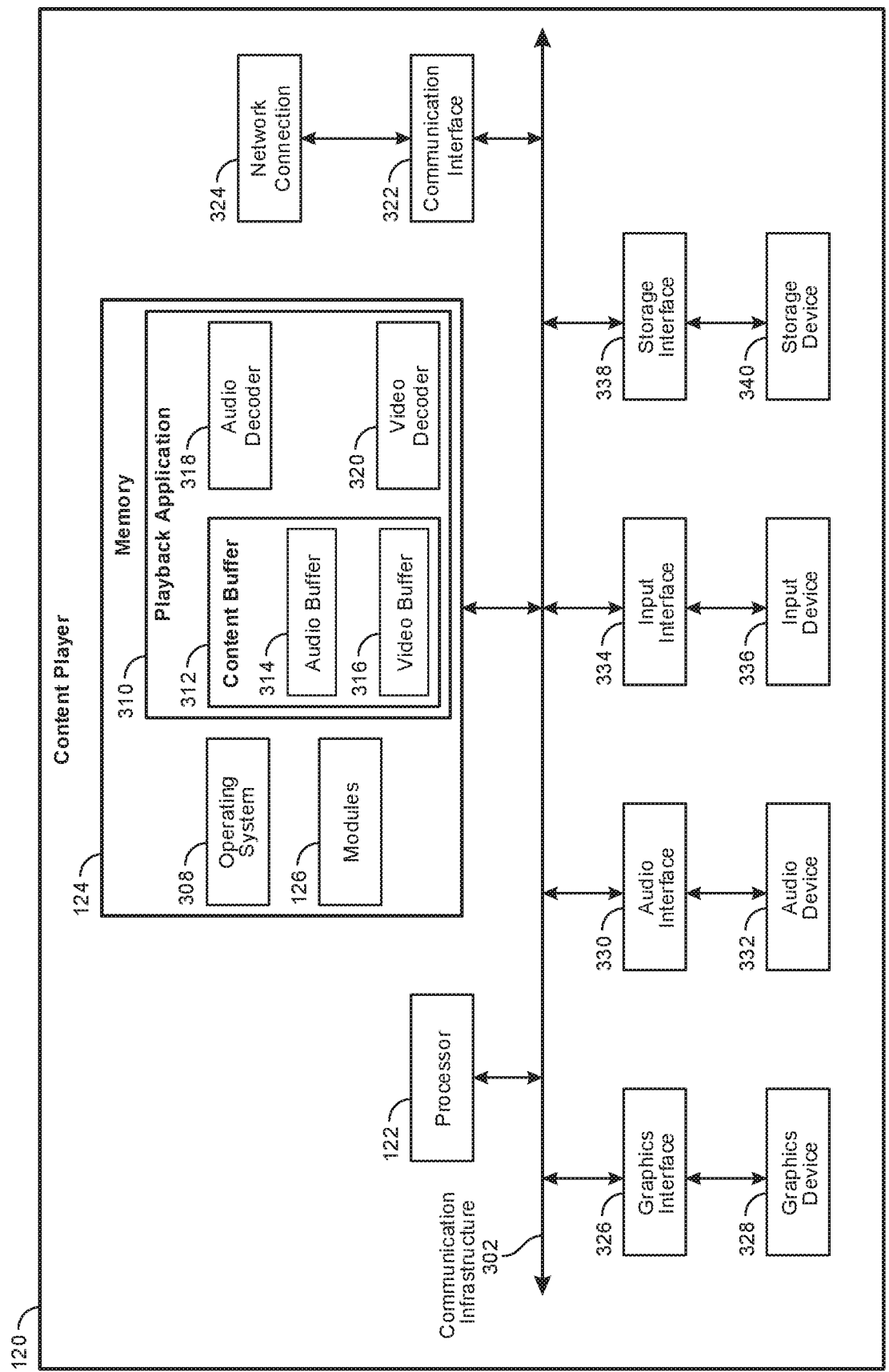
FIG. 3 is a block diagram of an exemplary content player within the content distribution ecosystem shown in FIG. 1.

The following will provide, with reference to FIG. 1, detailed descriptions of exemplary ecosystems for adaptive streaming of multimedia content. The discussion corresponding to FIGS. 2 and 3 presents an overview of an exemplary distribution infrastructure and an exemplary content player, respectively. Detailed descriptions of corresponding computer-implemented methods for adaptive streaming of multimedia content will be provided in connection with FIG. 4.

FIG. 1 is a block diagram of a content distribution ecosystem 100 that includes a distribution infrastructure 110 in communication with a content player 120. In some embodiments, distribution infrastructure 110 may be configured to encode data at a specific data rate and to transfer the encoded data to content player 120. Content player 120 may be configured to receive the encoded data via distribution infrastructure 110 and to decode the data for playback to a user. The data provided by distribution infrastructure 110 may include audio, video, text, images, animations, interactive content, haptic data, virtual or augmented reality data, location data, gaming data, or any other type of data that may be provided via streaming.

Distribution infrastructure 110 generally represents any services, hardware, software, or other infrastructure components configured to deliver content to end users. For example, distribution infrastructure 110 may include content aggregation systems, media transcoding and packaging services, network components, and/or a variety of other types of hardware and software. Distribution infrastructure 110 may be implemented as a highly complex distribution system, a single media server or device, or anything in between. In some examples, regardless of size or complexity, distribution infrastructure 110 may include at least one physical processor 112 and at least one memory device 114. One or more modules 116 may be stored or loaded into memory 114 to enable adaptive streaming, as discussed herein.

Content player 120 generally represents any type or form of device or system capable of playing audio and/or video content that has been provided over distribution infrastructure 110. Examples of content player 120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 110, content player 120 may include a physical processor 122, memory 124, and one or more modules 126. Some or all of the adaptive streaming processes described herein may be performed or enabled by modules 126, and in some examples, modules 116 of distribution infrastructure 110 may coordinate with modules 126 of content player 120 to provide adaptive streaming of multimedia content.

In certain embodiments, one or more of modules 116 and/or 126 in FIG. 1 may represent one or more software applications or programs that, when executed by a computing device, may cause the computing device to perform one or more tasks. For example, and as will be described in greater detail below, one or more of modules 116 and 126 may represent modules stored and configured to run on one or more general-purpose computing devices. One or more of modules 116 and 126 in FIG. 1 may also represent all or portions of one or more special-purpose computers configured to perform one or more tasks.

In addition, one or more of the modules, processes, algorithms, or steps described herein may transform data, physical devices, and/or representations of physical devices from one form to another. For example, one or more of the modules recited herein may receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

Physical processors 112 and 122 generally represent any type or form of hardware-implemented processing unit capable of interpreting and/or executing computer-readable instructions. In one example, physical processors 112 and 122 may access and/or modify one or more of modules 116 and 126, respectively. Additionally or alternatively, physical processors 112 and 122 may execute one or more of modules 116 and 126 to facilitate adaptive streaming of multimedia content. Examples of physical processors 112 and 122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 114 and 124 generally represent any type or form of volatile or non-volatile storage device or medium capable of storing data and/or computer-readable instructions. In one example, memory 114 and/or 124 may store, load, and/or maintain one or more of modules 116 and 126. Examples of memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 2 is a block diagram of exemplary components of content distribution infrastructure 110 according to certain embodiments. Distribution infrastructure 110 may include storage 210, services 220, and a network 230. Storage 210 generally represents any device, set of devices, and/or systems capable of storing content for delivery to end users. Storage 210 may include a central repository with devices capable of storing terabytes or petabytes of data and/or may include distributed storage systems (e.g., appliances that mirror or cache content at Internet interconnect locations to provide faster access to the mirrored content within certain regions). Storage 210 may also be configured in any other suitable manner.

As shown, storage 210 may store, among other items, content 212, user data 214, and/or log data 216. Content 212 may include television shows, movies, video games, user-generated content, and/or any other suitable type or form of content. User data 214 may include personally identifiable information (PII), payment information, preference settings, language and accessibility settings, and/or any other information associated with a particular user or content player. Log data 216 may include viewing history information, network throughput information, and/or any other metrics associated with a user's connection to or interactions with distribution infrastructure 110.

Services 220 may include personalization services 222, transcoding services 224, and/or packaging services 226. Personalization services 222 may personalize recommendations, content streams, and/or other aspects of a user's experience with distribution infrastructure 110. Encoding services 224 may compress media at different bitrates which, as described in greater detail below, may enable real-time switching between different encodings. Packaging services 226 may package encoded video before deploying it to a delivery network, such as network 230, for streaming.

Network 230 generally represents any medium or architecture capable of facilitating communication or data transfer. Network 230 may facilitate communication or data transfer using wireless and/or wired connections. Examples of network 230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, network 230 may include an Internet backbone 232, an internet service provider 234, and/or a local network 236. As discussed in greater detail below, bandwidth limitations and bottlenecks within one or more of these network segments may trigger video and/or audio bit rate adjustments.

FIG. 3 is a block diagram of an exemplary implementation of content player 120 of FIG. 1. Content player 120 generally represents any type or form of computing device capable of reading computer-executable instructions. Content player 120 may include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 3, in addition to processor 122 and memory 124, content player 120 may include a communication infrastructure 302 and a communication interface 322 coupled to a network connection 324. Content player 120 may also include a graphics interface 326 coupled to a graphics device 328, an input interface 334 coupled to an input device 336, and a storage interface 338 coupled to a storage device 340.

Communication infrastructure 302 generally represents any type or form of infrastructure capable of facilitating communication between one or more components of a computing device. Examples of communication infrastructure 302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 124 generally represents any type or form of volatile or non-volatile storage device or medium capable of storing data and/or other computer-readable instructions. In some examples, memory 124 may store and/or load an operating system 308 for execution by processor 122. In one example, operating system 308 may include and/or represent software that manages computer hardware and software resources and/or provides common services to computer programs and/or applications on content player 120.

Operating system 308 may perform various system management functions, such as managing hardware components (e.g., graphics interface 326, audio interface 330, input interface 334, and/or storage interface 338). Operating system 308 may also provide process and memory management models for playback application 310. The modules of playback application 310 may include, for example, a content buffer 312, an audio decoder 318, and a video decoder 320.

Playback application 310 may be configured to retrieve digital content via communication interface 322 and play the digital content through graphics interface 326. Graphics interface 326 may be configured to transmit a rendered video signal to graphics device 328. In normal operation, playback application 310 may receive a request from a user to play a specific title or specific content. Playback application 310 may then identify one or more encoded video and audio streams associated with the requested title. After playback application 310 has located the encoded streams associated with the requested title, playback application 310 may download sequence header indices associated with each encoded stream associated with the requested title from distribution infrastructure 110. A sequence header index associated with encoded content may include information related to the encoded sequence of data included in the encoded content.

In one embodiment, playback application 310 may begin downloading the content associated with the requested title by downloading sequence data encoded to the lowest audio and/or video playback bit rates to minimize startup time for playback. The requested digital content file may then be downloaded into content buffer 312, which may be configured to serve as a first-in, first-out queue. In one embodiment, each unit of downloaded data may include a unit of video data or a unit of audio data. As units of video data associated with the requested digital content file are downloaded to the content player 120, the units of video data may be pushed into the content buffer 312. Similarly, as units of audio data associated with the requested digital content file are downloaded to the content player 120, the units of audio data may be pushed into the content buffer 312. In one embodiment, the units of video data may be stored in video buffer 316 within content buffer 312 and the units of audio data may be stored in audio buffer 314 of content buffer 312.

A video decoder 320 may read units of video data from video buffer 316 and may output the units of video data in a sequence of video frames corresponding in duration to the fixed span of playback time. Reading a unit of video data from video buffer 316 may effectively de-queue the unit of video data from video buffer 316. The sequence of video frames may then be rendered by graphics interface 326 and transmitted to graphics device 328 to be displayed to a user.

An audio decoder 318 may read units of audio data from audio buffer 314 and output the units of audio data as a sequence of audio samples, generally synchronized in time with a sequence of decoded video frames. In one embodiment, the sequence of audio samples may be transmitted to audio interface 330, which may convert the sequence of audio samples into an electrical audio signal. The electrical audio signal may then be transmitted to a speaker of audio device 332, which may, in response, generate an acoustic output.

In situations where the bandwidth of distribution infrastructure 110 is limited and/or variable, playback application 310 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Graphics interface 326 may be configured to generate frames of video data and transmit the frames of video data to graphics device 328. In one embodiment, graphics interface 326 may be included as part of an integrated circuit, along with processor 122. Alternatively, graphics interface 326 may be configured as a hardware accelerator that is distinct from (i.e., is not integrated within) a chipset that includes processor 122.

Graphics interface 326 generally represents any type or form of device configured to forward images for display on graphics device 328. For example, graphics device 328 may be fabricated using liquid crystal display (LCD) technology, cathode-ray technology, and light-emitting diode (LED) display technology (either organic or inorganic). In some embodiments, graphics device 328 may also include a virtual reality display and/or an augmented reality display. Graphics device 328 may include any technically feasible means for generating an image for display. In other words, graphics device 328 generally represents any type or form of device capable of visually displaying information forwarded by graphics interface 326.

As illustrated in FIG. 3, content player 120 may also include at least one input device 336 coupled to communication infrastructure 302 via input interface 334. Input device 336 generally represents any type or form of computing device capable of providing input, either computer or human generated, to content player 120. Examples of input device 336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 120 may also include a storage device 340 coupled to communication infrastructure 302 via a storage interface 338. Storage device 340 generally represents any type or form of storage device or medium capable of storing data and/or other computer-readable instructions. For example, storage device 340 may be a magnetic disk drive, a solid-state drive, an optical disk drive, a flash drive, or the like. Storage interface 338 generally represents any type or form of interface or device for transferring data between storage device 340 and other components of content player 120.

Many other devices or subsystems may be included in or connected to content player 120. Conversely, one or more of the components and devices illustrated in FIG. 3 need not be present to practice the embodiments described and/or illustrated herein. The devices and subsystems referenced above may also be interconnected in different ways from that shown in FIG. 3. Content player 120 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program may be loaded into content player 120. All or a portion of the computer program stored on the computer-readable medium may then be stored in memory 124 and/or storage device 340. When executed by processor 122, a computer program loaded into memory 124 may cause processor 122 to perform and/or be a means for performing the functions of one or more of the example embodiments described and/or illustrated herein. Additionally or alternatively, one or more of the example embodiments described and/or illustrated herein may be implemented in firmware and/or hardware. For example, content player 120 may be configured as an Application Specific Integrated Circuit (ASIC) adapted to implement one or more of the example embodiments disclosed herein.

Figure 4:
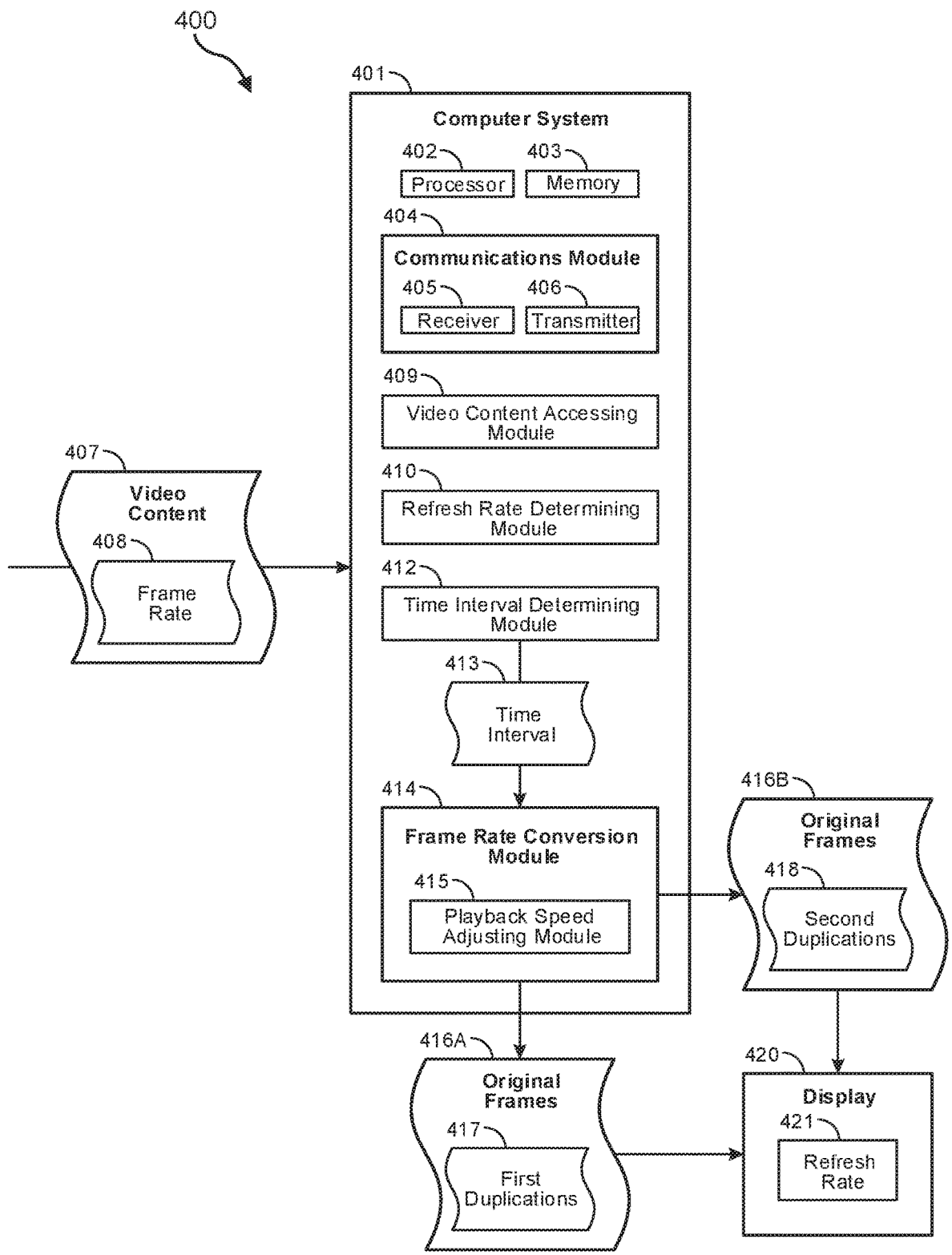
FIG. 4 illustrates a computing architecture in which the embodiments described herein operate.

FIG. 4 illustrates a computing environment 400 that includes a computer system 401. The computer system 401 may be substantially any type of computer system including a local computer system or a distributed (e.g., cloud) computer system. The computer system 401 includes at least one processor 402 and at least some system memory 403. The computer system 401 also includes program modules for performing a variety of different functions. The program modules are hardware-based, software-based, or include a combination of hardware and software. Each program module uses computing hardware and/or software to perform specified functions, including those described herein below.

For example, the communications module 404 communicates with other computer systems. The communications module 404 includes wired or wireless communication means that receive and/or transmit data to or from other computer systems. These communication means may include hardware radios including, for example, a hardware-based receiver 405, a hardware-based transmitter 406, or a combined hardware-based transceiver capable of both receiving and transmitting data. The radios may be WIFI radios, cellular radios, Bluetooth radios, global positioning system (GPS) radios, or other types of radios. The communications module 404 interacts with databases, mobile computing devices (such as mobile phones or tablets), embedded or other types of computing systems.

The computer system 401 also includes a video content accessing module 409. The video content accessing module 409 receives video content 407 from a content source. The video content source may be a producer of a video (e.g., a film or television show), the distributor of a video (e.g., a streaming video content provider), or other entity that provides video content to an electronic device. As noted above, the computer system 401 may be any type of computer system including a set top box, mobile phone, laptop, PC, or other computer system that runs software applications including video streaming client applications. At least one of these applications receives video content 407 and presents that video content on a display (e.g., display 420).

The video content 407 is encoded at a specified frame rate. The frame rate may be 24 fps, 25 fps, 30 fps, or some other frame rate. The video content accessing module 409 accesses this video content 407 and prepares the video content for subsequent operations on the computer system 401. Before or after receiving the video content 407, the refresh rate determining module 410 determines the rate at which the electronic display 420 is set to refresh its content. For example, the display 420 may refresh the content for display at a rate of 50 Hz, 60 Hz, 100 Hz, 120 Hz, or some other refresh rate. As such, the display redraws or represents a given video frame 50, 60, 100, or 120 times per second. As noted above, display refresh rates vary all over the world. For an optimal viewing experience, the refresh rate 421 of the display 420 is synchronized with the encoded frame rate 408 of the video content 407 so that the video frames shown on the display are consistent. That is, the video frames are duplicated in a manner that is not noticeable to the viewer.

To accomplish this duplication, the time interval determining module 412 identifies or specifies a time interval 413 for the video content. In at least some embodiments this time interval 413 is longer than one second and thus, in contrast to conventional systems that only look at one-second time intervals, the time interval over which frame rate conversion is applied covers two, three, or more seconds. The frame rate conversion module 414 carries out the frame rate conversion based on the video content's frame rate 408 and the display's refresh rate 421.

As part of the frame rate conversion process, the frame rate conversion module 414 looks at a relatively long interval of video content (e.g., three seconds) and generates a first sequence of frame duplications 417 to go along with the original video frames 416A of that time interval, and also generates a second sequence of frame duplications 418 to go along with the original video frames 416B of that time interval. Then, this time interval 413, with its original frames and its respective sequence of frame duplications is played back on the display 420. However, certain portions of the time interval of video content 407 are played back at different speeds. The playback speed adjusting module 415 increases or decreases the playback speed of the original frames and/or the various sequences of frame duplications in order to create a video playback that is seamless to the viewer's eye. These concepts will be explained further below with regard to method 500 of FIG. 5.

Figure 5:
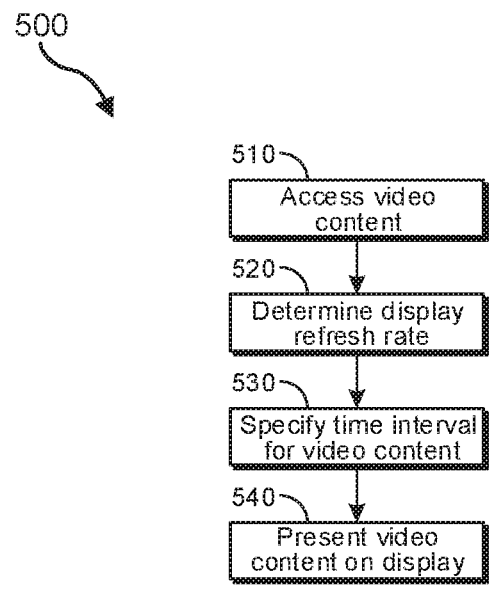
FIG. 5 illustrates a flow diagram of an exemplary method for aligning the frame rate of a video with the refresh rate of an electronic display.

FIG. 5 is a flow diagram of an exemplary computer-implemented method 500 for aligning the frame rate of a video with the refresh rate of an electronic display. The steps shown in FIG. 5 may be performed by any suitable computer-executable code and/or computing system, including the systems illustrated in FIGS. 1-4. In one example, each of the steps shown in FIG. 5 may represent an algorithm whose structure includes and/or is represented by multiple sub-steps, examples of which will be provided in greater detail below.

As illustrated in FIG. 5, at step 510, one or more of the systems or modules described herein accesses a portion of video content, which is encoded at a specified frame rate. For example, the video content accessing module 409 of FIG. 4 accesses video content 407, which has been encoded at a frame rate 408. In some examples, the frame rate is 24 fps. At step 520, the refresh rate determining module 410 of computer system 401 determines a refresh rate for an electronic display 420 on which the video content is to be presented. In some examples, the refresh rate 421 of the display 420 is 50 Hz, and in other examples, the refresh rate is 60 Hz. The time interval determining module 412 determines, at step 530, a time interval 413 over which to apply frame rate conversion. In some examples, this time interval is three seconds. Thus, in this example, frame rate conversion is applied over three seconds of video content to synchronize the frame rate 408 of the video content 407 with the refresh rate 421 of the electronic display 420.

At step 540, the frame rate conversion module 414 performs the frame rate conversion over the time interval 413 and presents the time interval of video content on the electronic display 420. This process of frame rate conversion and presentation on the electronic display 420 includes: adjusting playback speed for a first portion of the specified interval of video content, such that the first portion of the specified interval is played back using original video frames and a first sequence of frame duplications. Playback speed of a second, subsequent portion of the specified interval of video content is also adjusted, such that the second portion of the specified interval is played back using the original video frames and second, different sequence of frame duplications.

Figure 6:
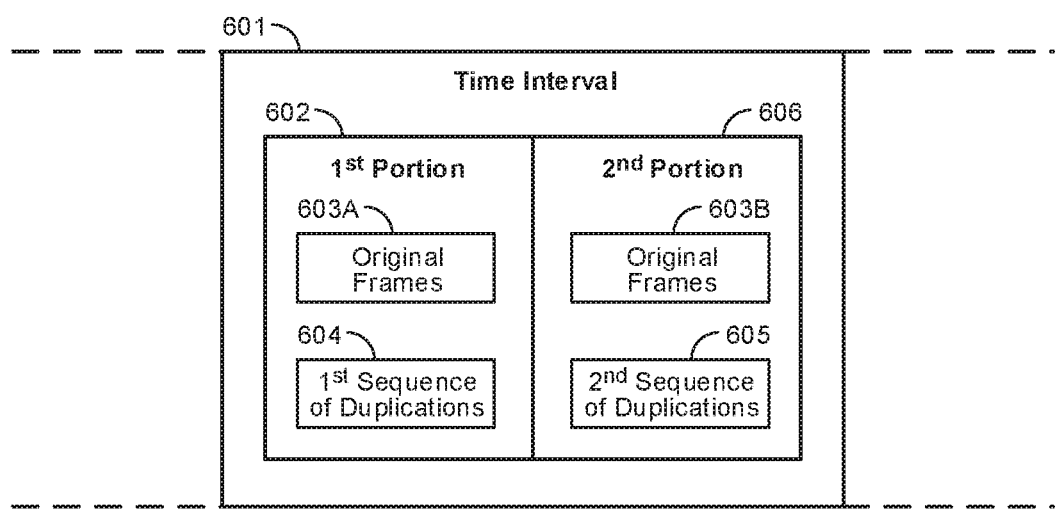
FIG. 6 illustrates an embodiment of a time interval having two different portions of video content.

For example, as shown in FIG. 6, a time interval 601 (which may be the same as or different than time interval 413 of FIG. 4) is split into different portions. While more or fewer than two portions may be used, the embodiment in FIG. 6 includes two portions. The dotted lines in FIG. 6 indicate that the time interval 601 may be selected from any part of the video content including the beginning, the middle, or the end. In some cases, the time interval 601 spans multiple refreshes of the display 420, and in some cases, the time interval 601 spans a single refresh of the display 420.

The first portion 602 of the time interval 601 includes a sequence of original video frames 603A and a sequence of duplications 604. The second portion 606 of the time interval 601 includes a sequence of original video frames 603B and a different sequence of duplications 605. The first and second portions of the time interval may be divided into substantially any proportion including 50/50, 60/40, 70/30, 80/20, 90/10, or any other proportion. Thus, the first portion 602 may take up more or less of the time interval than the second portion 606. Each portion includes original frames and/or duplicate frames. The playback speed of these original frames and duplicate frames is adjustable by the playback speed adjusting module 415.

In at least some embodiments, the playback speed of the original frames or the playback speed of the first or second duplications 604/605 may be increased or decreased to ensure that a specified number of frames fit within the time interval 601. For example, if video content 407 of FIG. 4 has a frame rate 408 of 24 fps, the time interval 601 may include 24 original frames, 24 duplicate frames in the first sequence of duplications 604, and two duplicate frames in the second sequence of duplications 605. In other embodiments, the time interval 601 may include 22 original frames, 22 duplicate frames in the first sequence of duplications 604, and six duplicate frames in the second sequence of duplications 605. The playback speed of these original and duplicate frames may be increased or decreased to ensure that the video content is played back smoothly to the user. This increase or decrease in playback speed may be made without adjusting the audio speed.

Beyond specified limits, adjusting the playback speed of the video content without also adjusting the audio playback speed would lead to noticeable A/V synch issues where a user is seen speaking before audio is heard, or is heard as speaking without moving their mouth. However, within certain limits (e.g., within −125 ms to +45 ms), audio and video will be perceived to be in synch even if they are not perfectly aligned. The video content is typically played back using a presentation time stamp (PTS). In some embodiments, this presentation time stamp is altered to increase or decrease the playback speed of the video content. In other embodiments, a lookup table is implemented in conjunction with the PTS, where the lookup table adds or subtracts time values from the PTS and uses the modified values when playing back the video content. Accordingly, by increasing the time interval over which duplicate frames are created in order to align with the display refresh rate, and by speeding up or slowing down video playback within the specified limits, the embodiments herein allow even numbers of duplicate frames to be added over the time interval. This greatly increases smoothness in video playback and reduces or eliminates the judder introduced by other frame rate conversion solutions.

As noted above, and as shown in FIG. 7, the source frame rate 701 of the video content is typically 24 fps (or 24 Hz), 24 Hz, 30 Hz, 50 Hz, or 60 Hz. The frame rate conversion module 414 of FIG. 4 applies frame rate conversion 702 to align with a display refresh rate 703. As shown in FIG. 8, the frame rate conversion for some video content frame rates may appear smoother and may have fewer artifacts that would be noticeable to the viewer. For instance, in case #1 (at 801), the frame source rate is 50 Hz and is being converted for a 60 Hz display (at 802). The ratio of original frames to duplicate frames is 1.2 (at 803), or 50 original frames to 10 duplicate (first order) frames (at 804). In case #2, the frame source rate is 30 Hz and is being converted to 50 Hz for a ratio of 1.67, with 30 original frames, and 20 $1^{st}$ order duplicate frames for a total of 50 frames. In case #5, the frame source rate is 24 Hz and is being converted to 60 Hz for a ratio of 2.5, with 24 original frames, 24 $1^{st}$ order duplicate frames, and 12 $2^{nd}$ order duplicate frames (at 805), for a total of 60 frames.

Most of the cases #1-6 in FIG. 8 will play back smoothly and the viewer will not notice any severe judder in the picture. However, in cases #7-9, where the frame rate conversion goes from 24 Hz to 25 Hz or from 24 Hz to 50 Hz, ratios of 1.042 and 2.083 occur (at 803). Such ratios introduce cases where only a single frame with $1^{st}$ order duplication is presented (e.g., case #7), or where 24 frames with $1^{st}$ order duplication are presented along with two frames with $2^{nd}$ order duplication (at 805) (e.g., case #8), or where 24 frames with $1^{st}$ order duplication are presented along with one frame with $2^{nd}$ order duplication and one frame with $3^{rd}$ order duplication (at 806) (e.g., case #9). Higher order frame duplication is typically less desirable as it often means low frame duplication count and longer frame display interval causing juddering artifacts.

For instance, $1^{st}$ order duplicates are frames that duplicate themselves once. Second order frames are frames that duplicate themselves twice, and $3^{rd}$ order frames are frames that duplicate themselves three times. A higher frame order number indicates that the original frames are duplicated more times and are thus less smooth and more prone to juddering. Accordingly, in the embodiments described herein, systems produce fixed duplication intervals for increased smoothness in playback. Moreover, frame duplications are kept below a minimum number (e.g., 2 duplications, $2^{nd}$ order) to avoid judder and other playback issues.

Figure 10A:
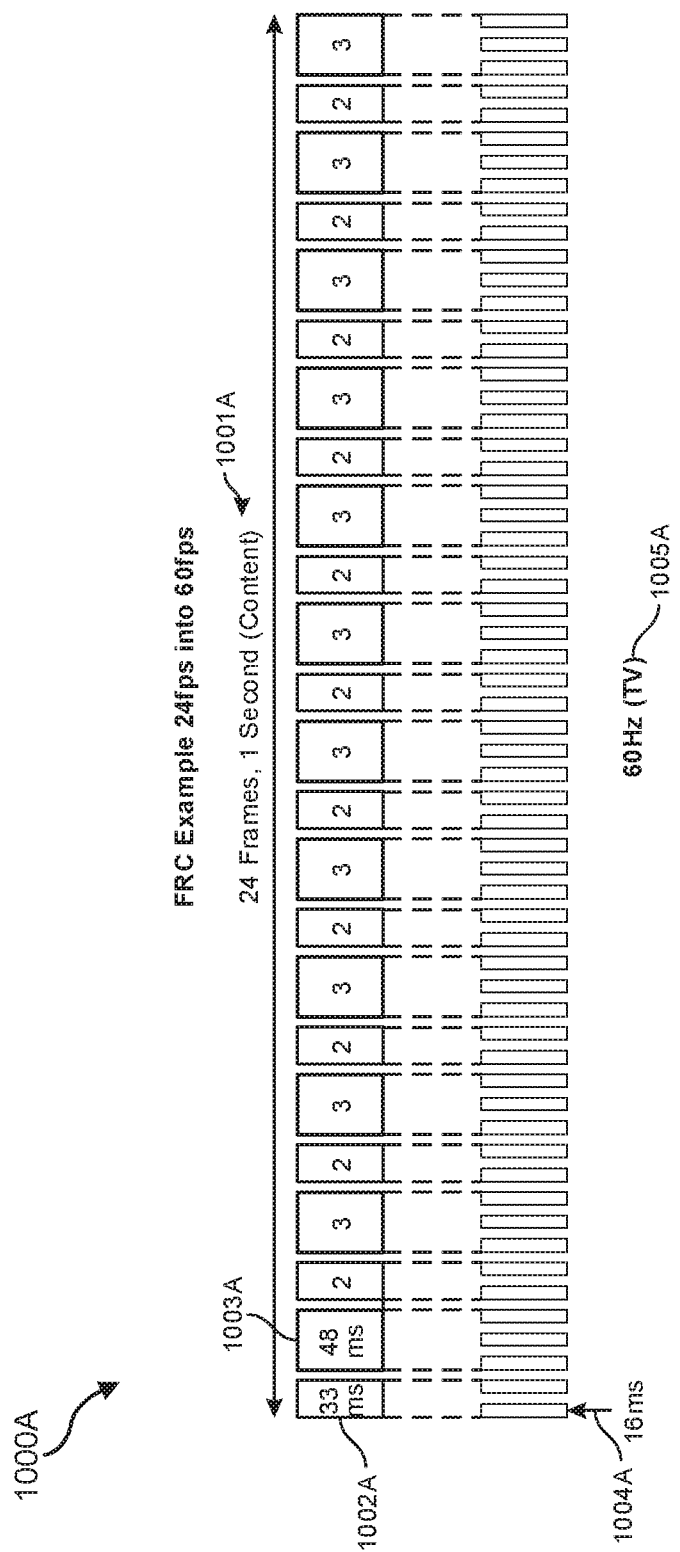
FIG. 10A illustrates an embodiment in which frame rate conversion is applied from 24 frames per second to 60 frames per second.

FIG. 9 illustrates an embodiment of an example frame duplication. Three original frames 901 are duplicated at 902 in a 3:2 pull down rate. FIG. 10A further illustrates this 3:2 pull down rate. In this example, a frame 1000A is converted from 24 fps to 60 fps. The frames are spaced over a 1 second time window 1001A. Each frame is duplicated once or twice. Thus, when added with the original frame, the original+single duplication=2, and the original+double duplication=3. Accordingly, the 3:2 pattern shown in FIG. 9 repeats itself over the one second length. Each original+single duplication is shown for 33 ms (1002A) and each original+double duplication is shown for 48 ms. These times coincide with two or three 16 ms segments 1004A resulting from the 60 Hz refresh rate on the TV 1005A. Other duplication patterns or intervals may also be used such as 3:2:2, or 3:2:2:2. Some patterns work better for displays that operate at 50 Hz and other patterns work better for displays that operate at 60 Hz.

Figure 10B:
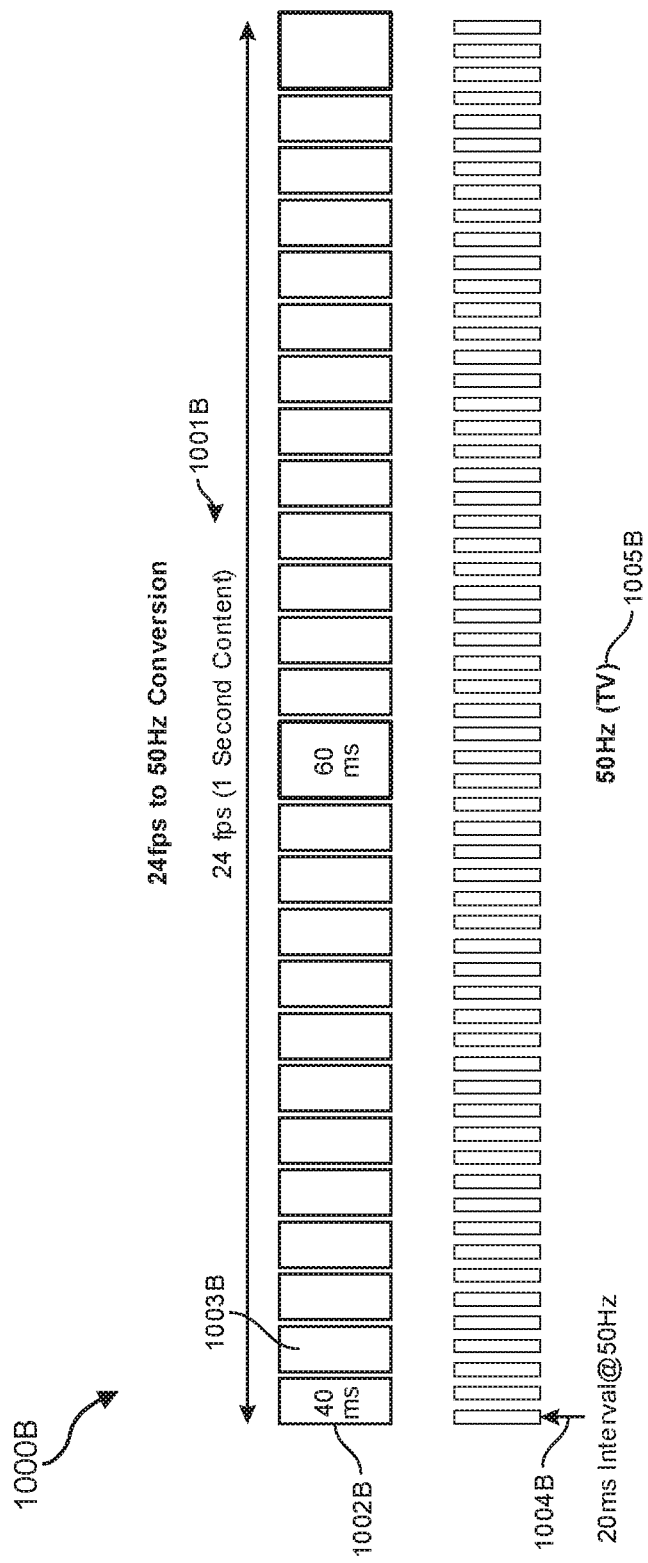
FIG. 10B illustrates an embodiment in which frame rate conversion is applied from 24 frames per second to 50 frames per second.

FIG. 10B illustrates an alternative example in which a frame 1000B is converted from 24 fps to 50 fps. The frames are spaced over a 1 second time window 1001B where each frame is duplicated once or twice. Each original+single duplication is shown for 40 ms (1002B) and each original+double duplication is shown for 60 ms. These times align with two or three 20 ms segments 1004B resulting from the 50 Hz refresh rate on the TV 1005B. Other duplication patterns or intervals may also be used as noted above.

Figure 10C:
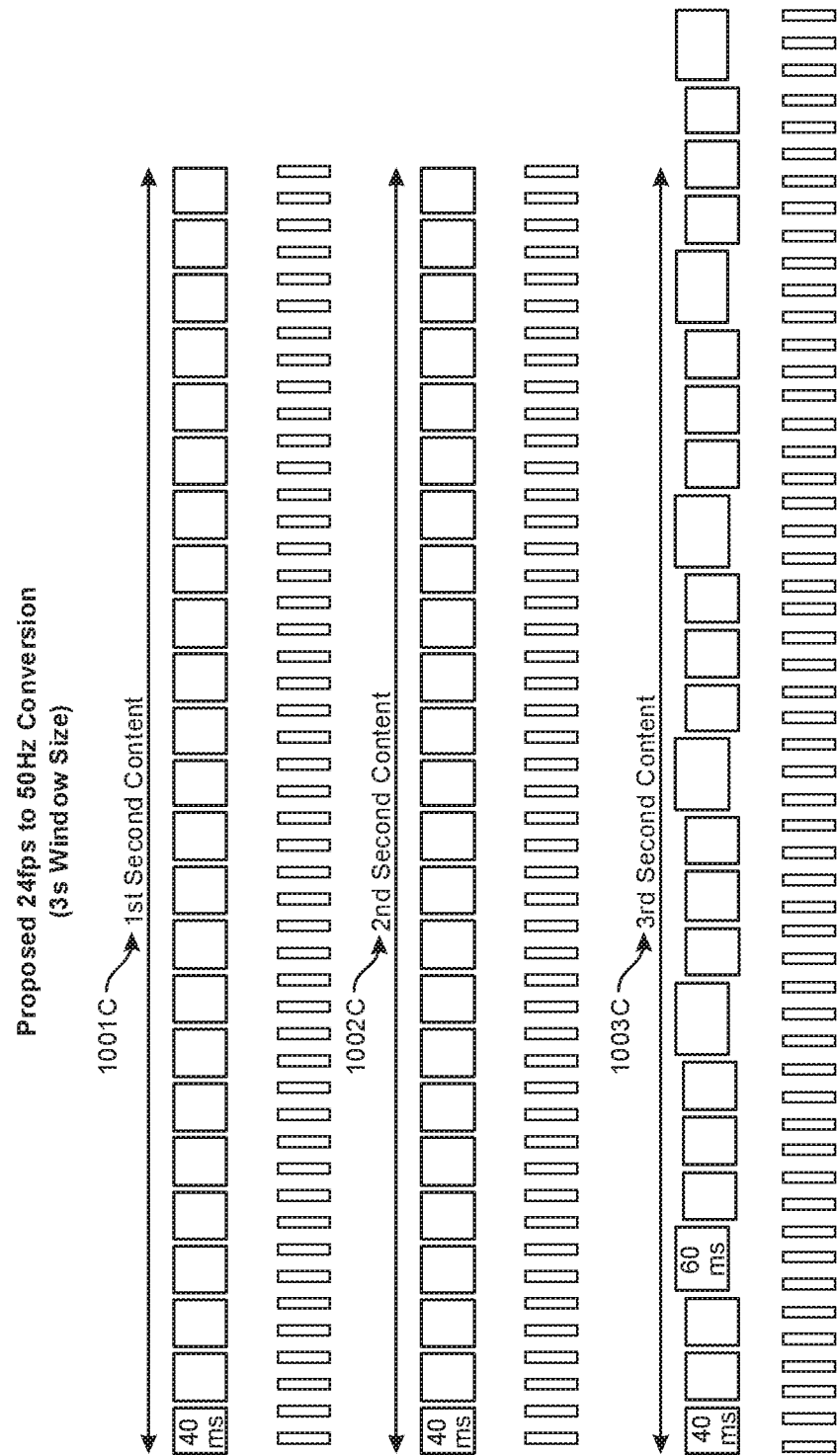
FIG. 10C illustrates an embodiment in which frame rate conversion is applied from 24 frames per second to 50 frames per second over a three-second window.

While the examples shown in FIGS. 10A and 10B show one second of content, it will be recognized that in the embodiments herein, time division of frames may be spread over different time intervals. For example, as shown in FIG. 10C, if a time interval of three seconds is chosen for a film that is encoded at 24 fps, that film will have 72 frames over the three second time interval. These 72 frames may be presented on a 50 Hz display that will have 150 display cycles over the three seconds. These 72 frames may be converted by the frame rate conversion module 414 of FIG. 4 at a certain rate with original frames 416A and a first sequence of duplication 417 and other original frames 416B with their own, different set of corresponding duplicate frames 418. The $1^{st}$ second of content 1001C includes original frames and duplications played back at a steady 40 ms slice per (frame+duplicate). The $2^{nd}$ second of content also includes original frames and duplications played back at a steady 40 ms slice per frame. The $3^{rd}$ second of content in the 3-second window, however, includes multiple 60 ms slice in which an (original+two duplicates) are played back. As noted in FIG. 11B below, these six 60 ms slice may be modulated at a different speed to realign the audio and video.

Figures 11A, 11B:
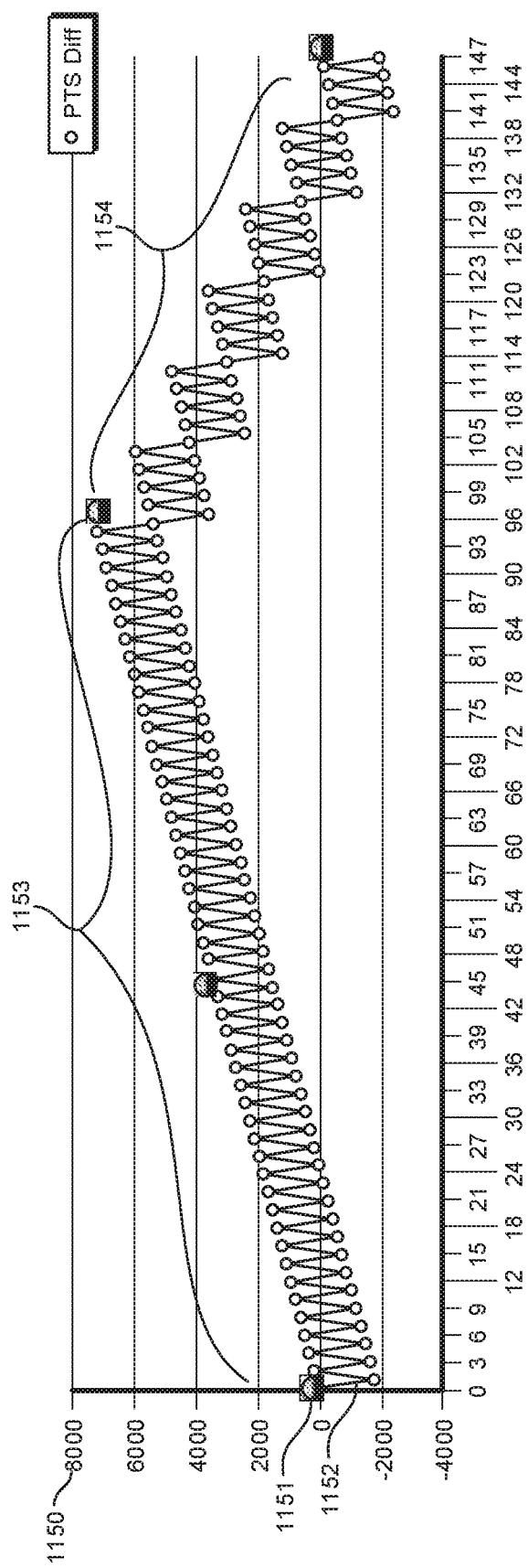
FIG. 11A illustrates a chart having different time intervals, frame duplication numbers, orders, and playback speeds.
FIG. 11B illustrates an embodiment in which multiple duplicate video frames are played back at a specified playback speed.
Figure 11C:
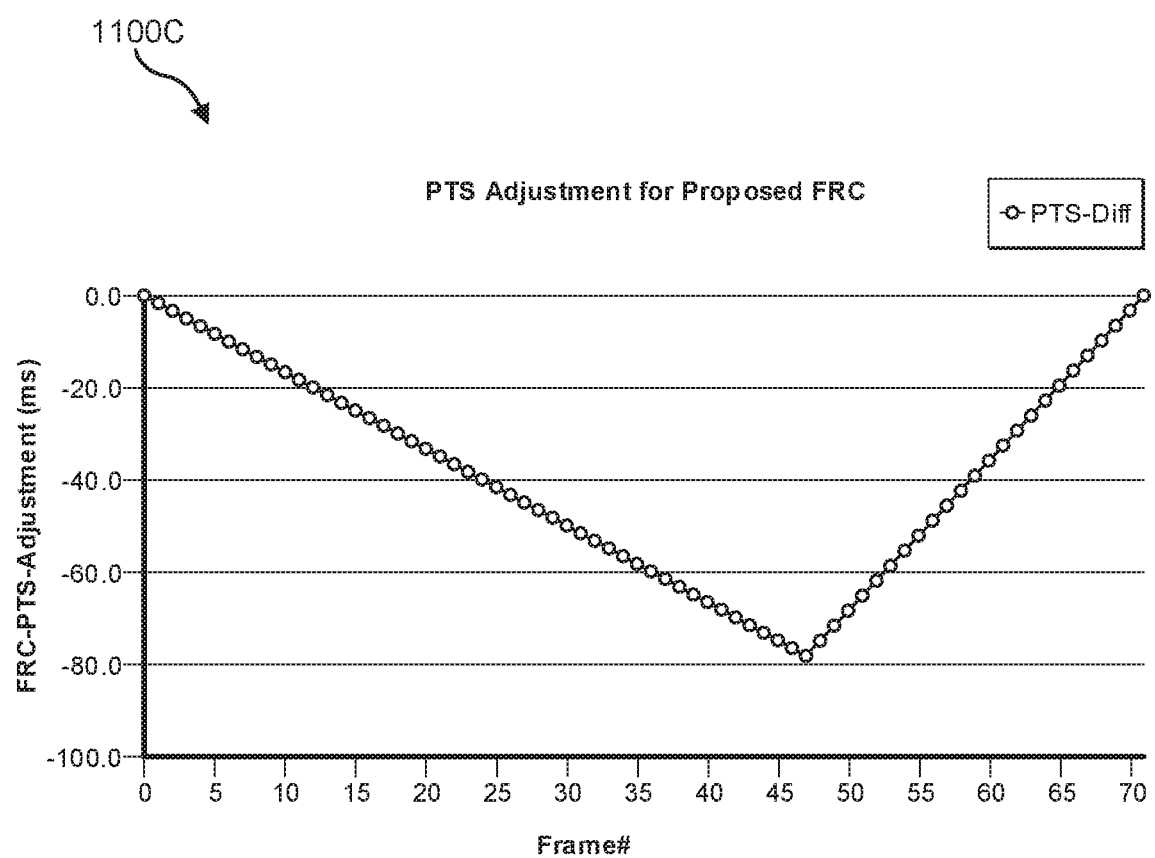
FIG. 11C illustrates an embodiment in which a presentation time stamp is adjusted in conjunction with frame rate conversion.

FIG. 11A, for example, illustrates a frame rate conversion (FRC) window 1100 in which the time interval for the window is three seconds. This three-second time window is broken up into three different segments of one second each (0 to 1, 1 to 2, and 2 to 3). In this example, like with FIG. 10A, the encoded frame rate of the video content is 24 fps. As such, 72 frames will be shown over the three-second time window. In contrast to traditional playback applications or set top boxes that play the frames at a steady rate, the embodiments herein may play the first 24 frames in the first second of content. Thus, as shown in chart 1100, 24 original frames are shown in the first second, from 0 to 1, along with 24 $1^{st}$ order frame duplications. This 1:1 match provides a smooth playback experience on a 50 Hz display, as each frame on the electronic display has either a corresponding original frame or $1^{st}$ order duplication. These frames are shown in the duration of 0.96 s of the electronic display.

Continuing this example, from second 24 original frames are again provided to the display by the frame rate conversion module (e.g., 414 of FIG. 4), along with 24 $1^{st}$ order duplicate frames. These 48 frames, along with the prior 48 frames from second 0 to 1 of content, are played back at a higher speed, allowing 48 frames to be shown in the duration of 0.96 s with video content encoded at 24 fps. The playback speed adjusting module 415 of FIG. 4 adjusts the playback speed upward to allow these 96 frames of 2 seconds content to be played in 1.92 seconds, aligning squarely with the 50 Hz display. Speeding up the video playback, however, does not necessarily speed up playback of the audio, which may be noticeable to the viewer. Instead, the video speed increases are kept within the bounds noted earlier (e.g., within −125 ms to +45 ms) with respect to the audio.

FIG. 11B illustrates how the audio and video become separated (V-A) when the playback speed of the video is increased. For example, at time 0, an A/V synch 1151 occurs. At this point, the audio and video are fully aligned. Over the first two seconds of the three-second time window (e.g., the period represented by 1153), two other A/V synchs occur. However, line 1152, which represents the display of original frames and duplicate frames, shows that the display of these frames becomes slowly out of synch with the audio (e.g., 40 ms out of synch at one second, and 80 ms out of synch at two seconds). Ideally, the A/V synch would occur at 0 each new frame. However, as shown in FIG. 11A, the third second of the three-second window only shows 24 original frames and 24 $1^{st}$ order duplicate frames, along with six $2^{nd}$ order frames shown in duration of 2.08 seconds. These frames are played back slower, as shown by period 1154 of FIG. 11B. The slower playback gradually brings the audio and video back in synch so that by the end of the three-second window, the A/V synch again occurs at 0. Throughout this three-second time window, 150 frames have been shown (24+24+24+24+24+24+6), which aligns squarely with the 150 cycles that would be presented on a 50 Hz display.

Thus, the playback speed adjusting module 4154 of the frame rate conversion module 414 of FIG. 4 may adjust and increase playback speed of some video content over a specified time interval, and may decrease playback speed of other video content over that same interval. As such, by the end of the interval, the audio and video are back in synch. Throughout this process, specified limits may be established and maintained, such that the playback speed is adjusted within a specified maximum amount of speeding or slowing. By staying within these maximum slowing or speeding boundaries, the viewing user will not be aware of the video speed changes. Rather, the viewer's eyes will simply interpolate the images as smooth motion.

In some cases, when the playback speed adjusting module 415 adjusts the playback speed of a portion of video content, the adjusting module alters a presentation time stamp (PTS) associated with the video content and the duplication frame interval in each order. In such embodiments, as shown in chart 1100C of FIG. 11C, the sequence is 24:24:24 in order to allow $2^{nd}$ order frame duplication in the last section of the window have fixed interval. The PTS is adjusted over the course of 72 frames. For the first 48 frames, the PTS is adjusted downward, which speeds up the playback. Then, after frame 48, the PTS is adjusted upward, which slows down the playback speed back to the point of alignment. In some cases, the playback speed adjusting module 415 may create a lookup table that adds or subtracts time from each PTS entry, and then use the lookup table when playing back the video content. In some cases, the lookup table includes delta values that are applied during presentation of the time interval of video content on the electronic display. The delta values are used to adjust the presentation time stamp for each frame within the time interval of video content. The lookup table may thus store the delta values used to indicate playback speed for each interval of a piece of video content.

In the example embodiment of FIGS. 11A and 11B, it will be understood that substantially any length of time window may be used, and any number of $1^{st}$ order or $2^{nd}$ order duplicates may be used. In some cases, the $2^{nd}$ order frames (or the second sequence of frame duplications) includes at least a minimum threshold number of duplicate frames. This minimum threshold number may be substantially any number and may be set by policies. The minimum threshold number may be different, for example, for different encoded frame rates, for different display refresh rates, or based on other situational settings or preferences.

In some cases, the playback speed for a given piece of video content is adjusted based on the type of video frames being presented. For instance, some video content may be encoded at higher rates for fast motion video or other effects. The playback speed of different segments of a time window may be adjusted to accommodate for this type of video content. In some cases, intervals of video content that include only first order frame duplications are automatically played back at a specified playback speed, while intervals of video content that include second order frame duplications are automatically played back at a different playback speed. Thus, the application or set top box playing the video content to the display may adjust the playback speed automatically when certain duplication frame types are detected.

Figure 12:
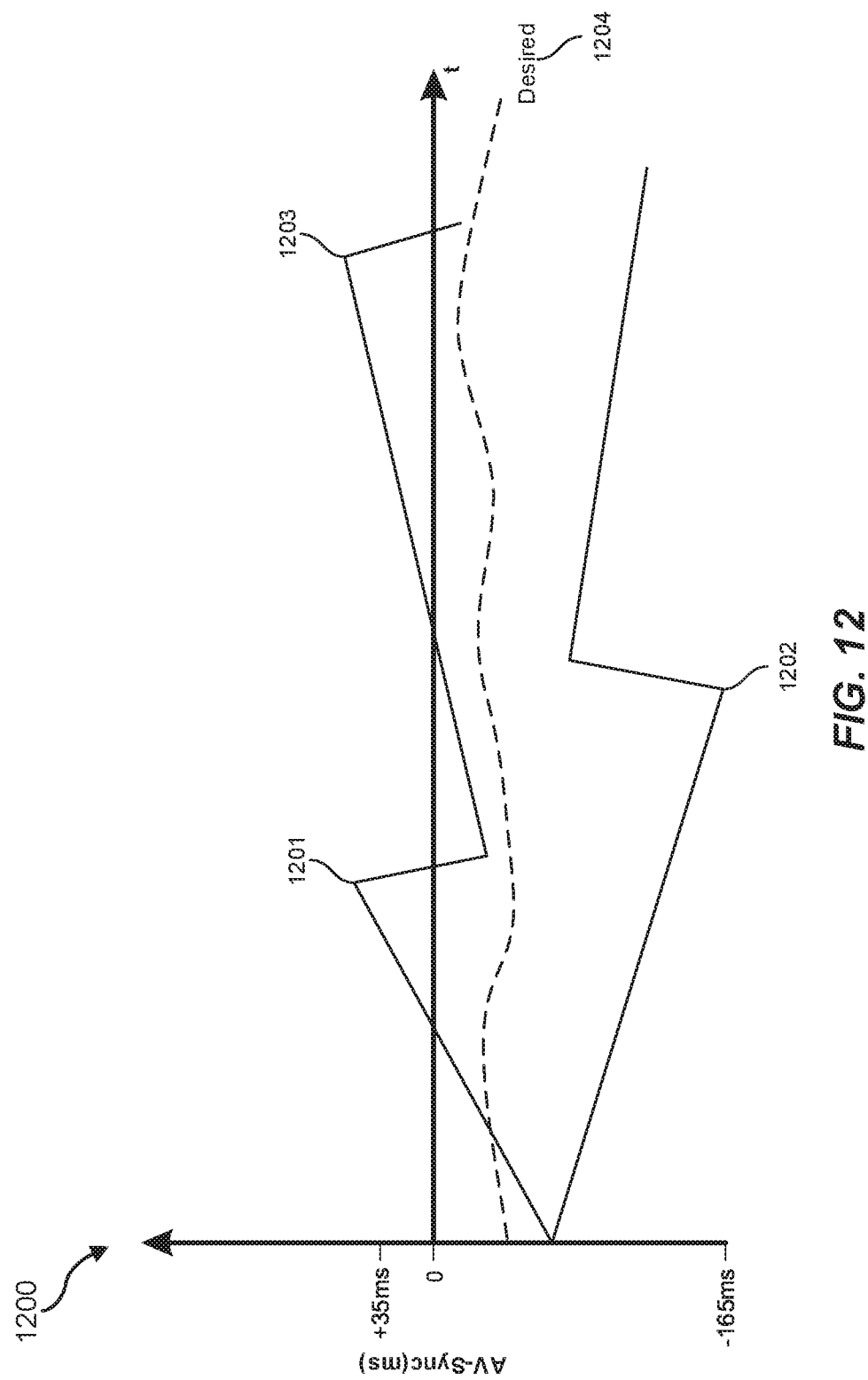
FIG. 12 illustrates an embodiment in which audio and video synchronizations are corrected to produce a desired audio/video output.

FIG. 12 illustrates an embodiment in which time intervals of video content are tested to ensure they are within set A/V synch boundaries. For example, chart 1200 of FIG. 12 shows time on the x-axis and a time value of audio/video synchronicity on the y-axis. The y-axis indicates that, in this testing embodiment, the A/V synch may be ahead by up to +35 ms and behind by as much as −165 ms. At point 1201, the A/V synch is close to or past the +35 ms threshold and as such, is synchronized at this point to bring the synch closer to 0 by skipping original video frames (video is advanced by 42 ms per frame @24 frame per second). At points 1202 and 1203, the A/V synch has also drifted towards the respective maximum thresholds. At these points, the video is played faster or slower to realign the audio and video to a desired synchronicity level 1204 (by repeating original frames (video is slowed down by 42 ms per frame @ 24 fps). Throughout the presentation of a portion of video content (e.g., 407 of FIG. 4), the computer system 401 may test the presentation of each time interval or certain time intervals to verify that the A/V synch is within the specified boundaries. Various quality metrics may be measured regarding playback of the video content including number of $1^{st}$ order duplicate frames used, number of $2^{nd}$ or $3^{rd}$ order duplicate frames used, level of synchronicity between audio and video, or other metrics. These metrics may then be used as feedback to ensure that the viewer is having a positive viewing experience without noticeable video freezing or fast motion effects.

In some embodiments, a corresponding system includes a physical processor and physical memory. The physical memory includes computer-executable instructions that, when executed by the physical processor, cause the physical processor to perform the following: access a portion of video content, where the video content is encoded at a specified frame rate, determine a refresh rate for an electronic display on which the video content is to be presented, specify a time interval for the video content over which frame rate conversion is to be applied to synchronize the frame rate of the video content with the refresh rate of the electronic display, and present the specified time interval of video content on the electronic display, where the presenting includes adjusting playback speed for a first portion of the specified interval of video content, so that the first portion of the specified interval is played back using original video frames and a first sequence of frame duplications, and adjusting playback speed of a second, subsequent portion of the specified interval of video content, so that the second portion of the specified interval is played back using the original video frames and second, different sequence of frame duplications.

A corresponding non-transitory computer-readable medium includes computer-executable instructions that, when executed by at least one processor of a computing device, cause the computing device to access a portion of video content, where the video content is encoded at a specified frame rate, determine a refresh rate for an electronic display on which the video content is to be presented, specify a time interval for the video content over which frame rate conversion is to be applied to synchronize the frame rate of the video content with the refresh rate of the electronic display, and present the specified time interval of video content on the electronic display. The presenting includes: adjusting playback speed for a first portion of the specified interval of video content, so that the first portion of the specified interval is played back using original video frames and a first sequence of frame duplications, and adjusting playback speed of a second, subsequent portion of the specified interval of video content, so that the second portion of the specified interval is played back using the original video frames and second, different sequence of frame duplications.

Accordingly, in this manner, video content may be apportioned into longer length intervals. These longer length intervals allow different variations of original frames and duplicate frames. Moreover, playback speeds may be varied over these intervals to ensure that the playback on the electronic display is smooth and even throughout. The embodiments described herein may be used in substantially any country to convert substantially any source material into any display frame rate. As such, these implementations may be used by a video streaming provider in any market, regardless of which frame rate encoding or which display refresh rate is used in that country.

EXAMPLE EMBODIMENTS

1. A computer-implemented method comprising: accessing a portion of video content, the video content being encoded at a specified frame rate; determining a refresh rate for an electronic display on which the video content is to be presented; specifying a time interval for the video content over which frame rate conversion is to be applied to synchronize the frame rate of the video content with the refresh rate of the electronic display; and presenting the specified time interval of video content on the electronic display, wherein the presenting includes: adjusting playback speed for a first portion of the specified interval of video content, such that the first portion of the specified interval is played back using original video frames and a first sequence of frame duplications; and adjusting playback speed of a second, subsequent portion of the specified interval of video content, such that the second portion of the specified interval is played back using the original video frames and second, different sequence of frame duplications.

2. The computer-implemented method of claim 1, wherein the second, different sequence of frame duplications includes at least a minimum threshold number of duplicate frames.

3. The computer-implemented method of claim 1, wherein adjusting the playback speed for the first portion of the specified interval of video content comprises increasing the playback speed for the first portion of the specified interval of video content.

4. The computer-implemented method of claim 1, wherein adjusting the playback speed for the second portion of the specified interval of video content comprises decreasing the playback speed for the second portion of the specified interval of video content.

5. The computer-implemented method of claim 1, wherein the playback speed is adjusted within a specified maximum amount of speeding or slowing the playback speed.

6. The computer-implemented method of claim 1, wherein adjusting playback speed comprises altering a presentation time stamp associated with the video content.

7. The computer-implemented method of claim 1, wherein the specified time interval is longer than one second.

8. The computer-implemented method of claim 1, wherein the specified time interval is at least three seconds.

9. The computer-implemented method of claim 1, wherein the playback speed is adjusted based on the type of video frames being presented.

10. The computer-implemented method of claim 9, wherein intervals of video content that include one or more first order frame duplications are automatically played back at a specified playback speed.

11. The computer-implemented method of claim 9, wherein intervals of video content that include one or more second order frame duplications are automatically played back at a specified playback speed.

12. The computer-implemented method of claim 1, wherein the number of duplicated frames is repeated at a specified interval.

13. A system comprising: at least one physical processor; and physical memory comprising computer-executable instructions that, when executed by the physical processor, cause the physical processor to access a portion of video content, the video content being encoded at a specified frame rate; determine a refresh rate for an electronic display on which the video content is to be presented; specify a time interval for the video content over which frame rate conversion is to be applied to synchronize the frame rate of the video content with the refresh rate of the electronic display; and present the specified time interval of video content on the electronic display, wherein the presenting includes: adjust playback speed for a first portion of the specified interval of video content, such that the first portion of the specified interval is played back using original video frames and a first sequence of frame duplications; and adjust playback speed of a second, subsequent portion of the specified interval of video content, such that the second portion of the specified interval is played back using the original video frames and second, different sequence of frame duplications.

14. The system of claim 13, wherein the playback speed for each portion of the specified interval of video content is stored in a lookup table.

15. The system of claim 14, wherein the specified interval of video content is played back on the electronic display according to the playback information indicated in the lookup table.

16. The system of claim 15, wherein the lookup table includes one or more delta values that are applied during presentation of the specified time interval of video content on the electronic display to adjust a presentation time stamp for each frame within the specified time interval of video content.

17. The system of claim 13, further comprising testing the presentation of the specified time interval of video content on the electronic display to verify one or more specified quality metrics regarding playback of the video content.

18. The system of claim 12, wherein the frame rate of the video content is 24 frames per second and wherein the refresh rate for the electronic display is 50 Hz.

19. The system of claim 12, wherein the frame rate of the video content is 24 frames per second and wherein the refresh rate for the electronic display is 60 Hz.

20. A non-transitory computer-readable medium comprising one or more computer-executable instructions that, when executed by at least one processor of a computing device, cause the computing device to access a portion of video content, the video content being encoded at a specified frame rate; determine a refresh rate for an electronic display on which the video content is to be presented; specify a time interval for the video content over which frame rate conversion is to be applied to synchronize the frame rate of the video content with the refresh rate of the electronic display; and present the specified time interval of video content on the electronic display, wherein the presenting includes: adjusting playback speed for a first portion of the specified interval of video content, such that the first portion of the specified interval is played back using original video frames and a first sequence of frame duplications; and adjusting playback speed of a second, subsequent portion of the specified interval of video content, such that the second portion of the specified interval is played back using the original video frames and second, different sequence of frame duplications.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to determine how video content is to be presented, use the result of the transformation to present the video content, and store the result of the transformation to indicate how the video content was presented. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   accessing a portion of video content, the video content being encoded at a specified frame rate and being designed for playback at a specified playback speed, the encoded frame rate defining a specified frame duration for each frame of the video content;
   determining a refresh rate for an electronic display on which the video content is to be presented;
   specifying a time interval for the video content over which frame rate conversion is to be applied to synchronize the frame rate of the video content with the refresh rate of the electronic display; and
   presenting the specified time interval of video content on the electronic display, wherein the presenting includes:
     adjusting playback speed for a first portion of the specified interval of video content, such that the first portion of the specified interval of video content is played back at an increased playback speed in which an increased number of frames per second are played back for at least a portion of the specified time interval using original video frames, wherein the frames being played back at the increased playback speed are displayed for a shorter frame duration than that defined by the encoded frame rate; and
     adjusting playback speed of a second, subsequent portion of the specified interval of video content, such that the second portion of the specified interval of video content is played back at a reduced playback speed in which a decreased number of frames per second are played back for at least a portion of the specified time interval using the original video frames and a sequence of frame duplications, wherein the frames being played back at the decreased playback speed are displayed for a longer frame duration than that defined by the encoded frame rate.

2. The computer-implemented method of claim 1, wherein the sequence of frame duplications includes at least a minimum threshold number of duplicate frames.

3. The computer-implemented method of claim 1, wherein adjusting the playback speed for the first portion of the specified interval of video content comprises increasing the playback speed for the first portion of the specified interval of video content.

4. The computer-implemented method of claim 1, wherein adjusting the playback speed for the second portion of the specified interval of video content comprises decreasing the playback speed for the second portion of the specified interval of video content.

5. The computer-implemented method of claim 1, wherein the playback speed is adjusted within a specified maximum amount of speeding or slowing the playback speed.

6. The computer-implemented method of claim 1, wherein adjusting playback speed comprises altering a presentation time stamp associated with the video content.

7. The computer-implemented method of claim 1, wherein the specified time interval is longer than one second.

8. The computer-implemented method of claim 1, wherein the specified time interval is at least three seconds.

9. The computer-implemented method of claim 1, wherein the playback speed is adjusted based on the type of video frames being presented.

10. The computer-implemented method of claim 9, wherein intervals of video content that include one or more first order frame duplications are automatically played back at a specified playback speed.

11. The computer-implemented method of claim 9, wherein intervals of video content that include one or more second order frame duplications are automatically played back at a specified playback speed.

12. The computer-implemented method of claim 1, wherein the number of duplicated frames is repeated at a specified interval.

13. A system comprising:
at least one physical processor; and
physical memory comprising computer-executable instructions that, when executed by the physical processor, cause the physical processor to:
access a portion of video content, the video content being encoded at a specified frame rate and being designed for playback at a specified playback speed, the encoded frame rate defining a specified frame duration for each frame of the video content;
determine a refresh rate for an electronic display on which the video content is to be presented;
specify a time interval for the video content over which frame rate conversion is to be applied to synchronize the frame rate of the video content with the refresh rate of the electronic display; and
present the specified time interval of video content on the electronic display, wherein the presenting includes:
adjusting playback speed for a first portion of the specified interval of video content, such that the first portion of the specified interval of video content is played back at an increased playback speed in which an increased number of frames per second are played back for at least a portion of the specified time interval using original video frames, wherein the frames being played back at the increased playback speed are displayed for a shorter frame duration than that defined by the encoded frame rate; and
adjusting playback speed of a second, subsequent portion of the specified interval of video content, such that the second portion of the specified interval of video content is played back at a reduced playback speed in which a decreased number of frames per second are played back for at least a portion of the specified time interval using the original video frames and a sequence of frame duplications, wherein the frames being played back at the decreased playback speed are displayed for a longer frame duration than that defined by the encoded frame rate.

14. The system of claim 13, wherein the playback speed for each portion of the specified interval of video content is stored in a lookup table.

15. The system of claim 14, wherein the specified interval of video content is played back on the electronic display according to the playback information indicated in the lookup table.

16. The system of claim 15, wherein the lookup table includes one or more delta values that are applied during presentation of the specified time interval of video content on the electronic display to adjust a presentation time stamp for each frame within the specified time interval of video content.

17. The system of claim 13, further comprising testing the presentation of the specified time interval of video content on the electronic display to verify one or more specified quality metrics regarding playback of the video content.

18. The system of claim 13, wherein the frame rate of the video content is 24 frames per second and wherein the refresh rate for the electronic display is 50 Hz.

19. The system of claim 13, wherein the frame rate of the video content is 24 frames per second and wherein the refresh rate for the electronic display is 60 Hz.

20. A non-transitory computer-readable medium comprising one or more computer-executable instructions that, when executed by at least one processor of a computing device, cause the computing device to:
access a portion of video content, the video content being encoded at a specified frame rate and being designed for playback at a specified playback speed, the encoded frame rate defining a specified frame duration for each frame of the video content;
determine a refresh rate for an electronic display on which the video content is to be presented;
specify a time interval for the video content over which frame rate conversion is to be applied to synchronize the frame rate of the video content with the refresh rate of the electronic display; and
present the specified time interval of video content on the electronic display, wherein the presenting includes:
adjusting playback speed for a first portion of the specified interval of video content, such that the first portion of the specified interval of video content is played back at an increased playback speed in which an increased number of frames per second are played back for at least a portion of the specified time interval using original video frames, wherein the frames being played back at the increased playback speed are displayed for a shorter frame duration than that defined by the encoded frame rate; and
adjusting playback speed of a second, subsequent portion of the specified interval of video content, such that the second portion of the specified interval of video content is played back at a reduced playback speed in which a decreased number of frames per second are played back for at least a portion of the specified time interval using the original video frames and a sequence of frame duplications, wherein the frames being played back at the decreased playback speed are displayed for a longer frame duration than that defined by the encoded frame rate.

* * * * *